No. 647,377. Patented Apr. 10, 1900.
H. P. COLBY.
ANTIFRICTION BEARING FOR WHEELS.
(Application filed Sept. 9, 1899.)
(No Model.)
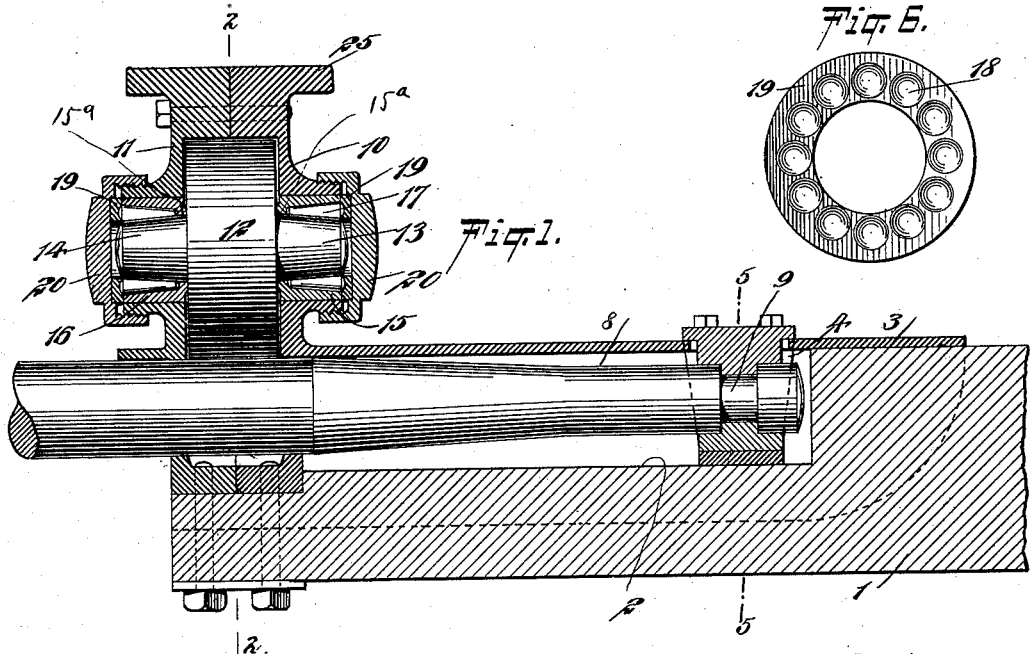
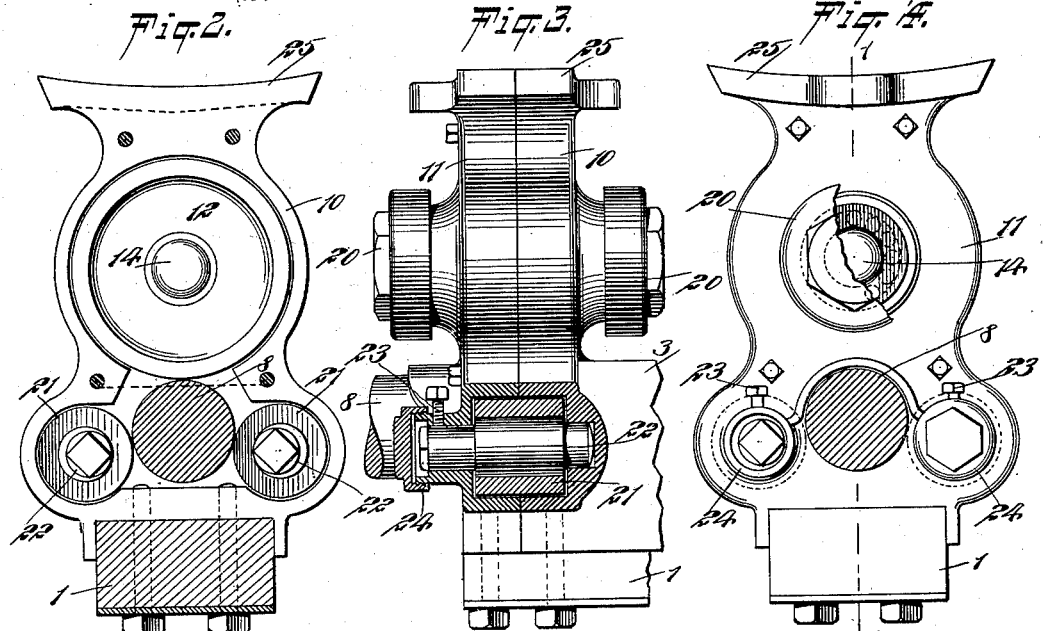
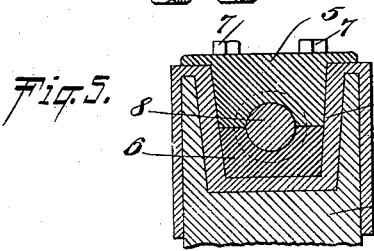
WITNESSES:
INVENTOR
ATTORNEYS

UNITED STATES PATENT OFFICE.

HARLAN PAGE COLBY, OF GRAND RAPIDS, MICHIGAN.

ANTIFRICTION-BEARING FOR WHEELS.

SPECIFICATION forming part of Letters Patent No. 647,377, dated April 10, 1900.

Application filed September 9, 1899. Serial No. 729,932. (No model.)

*To all whom it may concern:*

Be it known that I, HARLAN PAGE COLBY, of Grand Rapids, in the county of Kent and State of Michigan, have invented a new and Improved Antifriction-Bearing for Wheels, of which the following is a full, clear, and exact description.

This invention relates to improvements in bearings for wheels, particularly vehicle-wheels; and the object is to provide a bearing of simple construction by means of which friction will be reduced to a minimum and so constructed that the bearing may be readily adjusted when worn.

I will describe an antifriction-bearing for wheels embodying my invention and then point out the novel features in the appended claims.

Reference is to be had to the accompanying drawings, forming a part of this specification, in which similar characters of reference indicate corresponding parts in all the figures.

Figure 1 is a sectional elevation on the line 1 1 of Fig. 4, showing my invention applied. Fig. 2 is a section on the line 2 2 of Fig. 1. Fig. 3 is a partial section and partial side elevation. Fig. 4 is a partial section and partial end elevation. Fig. 5 is a section on the line 5 5 of Fig. 1, and Fig. 6 shows a thrust-ring employed.

Referring to the drawings, 1 designates an axle, the upper portion of which is cut away at the end, as indicated at 2, and this cut-away portion is closed at the top and sides by a casing 3. The casing 3 has a pocket 4, extended into the cut-away portion 2, and in this pocket is secured a thrust-block consisting of an upper section 5 and a lower section 6, the sections being secured together by bolts. Having a bearing in this thrust-block is a spindle 8, having a reduced portion 9, in which interior annular flanges of the thrust-block engage, thus holding the spindle from longitudinal movement relatively to the axle. The spindle extends outward beyond the end of the axle and is designed to have rigid connection with the hub of a wheel, which it is not deemed necessary to show in the drawings.

Arranged on the outer end of the casing 3 is a housing consisting of a section 10, which is formed integral with the casing 3, and a section 11, removably connected to the section 10 by means of suitable bolts. Mounted to rotate in the housing and engaging upon the upper side of the spindle 8 is a bearing-roller 12. This roller 12 is quite large, so that it has a considerable leverage, making the draft much easier.

The necks 13 and 14 of the roller 12 are longitudinally tapered and extend into casings 15 16, arranged in the hub portions of the housing-sections. Conical rollers 17 are arranged in the casings 15 and 16, the tapers of said rollers of course extending in an opposite direction to the taper of the roller-necks. The inner ends of these conical rollers engage against inwardly - extended annular flanges 15ª on the inner ends of the casings 15 and 16, and the outer ends, which are rounded, engage in correspondingly-shaped recesses 18 in thrust-rings 19, engaging with the outer ends of the casings. These thrust-rings are held in position by means of screw-caps 20 engaging with the hub portions of the housing-sections. These screw-caps not only serve to prevent the entrance of dust and dirt to the rollers, but they also serve for adjusting said rollers longitudinally when they become worn.

In the lower portion of the housing and engaging with opposite sides of the spindle somewhat below its longitudinal center are guide-rollers 21. These guide-rollers are mounted eccentrically on shafts 22, which may be rotated by means of a suitable key or wrench engaging with the outer annular ends. The object of thus placing the rollers eccentrically on the shaft is to provide for adjusting the rollers toward the spindle when said rollers or the spindle become worn. The shafts 22 may be held as adjusted by means of set-screws 23 and caps 24, screwed on the outer ends of the outer bearings of said shafts, to prevent the entrance of dust or dirt.

On the upper portion of the housing is a seat 25 for engaging a spring or the like. In operation it is obvious that the wheel and spindle will rotate together relatively to the axle.

Having thus fully described my invention, I claim as new and desire to secure by Letters Patent—

1. In an antifriction-bearing for wheels, an axle or fixed part, a spindle mounted to rotate in the axle, a thrust-block supported in the axle and in which the inner end of the spindle has a bearing, a housing supported on the outer end of the axle, a roller mounted in said housing and engaging with the upper side of the spindle, and guide-rollers in the housing engaging with the lower portion of the spindle, substantially as specified.

2. An antifriction-bearing for wheels, comprising an axle, a spindle mounted to rotate in the axle, a thrust-block arranged in the axle and in which the inner end of said spindle has a bearing, a housing on the axle, a roller in the housing engaging with the upper side of the spindle, guide-rollers engaging with the lower portion of the spindle, and shafts upon which said guide-rollers are eccentrically mounted, substantially as specified.

3. An antifriction-bearing for wheels, comprising an axle, a spindle mounted to rotate in the axle, a housing on the axle, a roller in said housing and engaging with the upper side of the spindle, roller-bearings in the housing and engaging with the necks of said roller, and guide-rollers engaging with the lower portion of the spindle, substantially as specified.

4. An antifriction-bearing for wheels, comprising an axle, a spindle mounted to rotate in the axle, a housing carried on the axle, a roller mounted in said housing and having tapered necks, tapered bearing-rollers in the housing and engaging with said tapered necks, thrust-rings with which the outer ends of said rollers engage, means for causing adjustments of said rings, and guide-rollers engaging with the lower portion of the spindle, substantially as specified.

5. An antifriction-bearing for wheels, comprising an axle having a cut-away portion, a casing to cover the top and sides of said cut-away portion, a thrust-block extended through an opening in the top of said casing, a spindle having its inner end bearing in said thrust-block, a housing consisting of a section integral with the casing, and a removable section, a roller in said housing and engaging with the upper side of the spindle, and guide-rollers in the housing and engaging with the lower portion of said spindle at opposite sides, substantially as specified.

HARLAN PAGE COLBY.

Witnesses:
MATTHEW C. LEWIS,
RICHARD BRAYTON.